Figure 1:
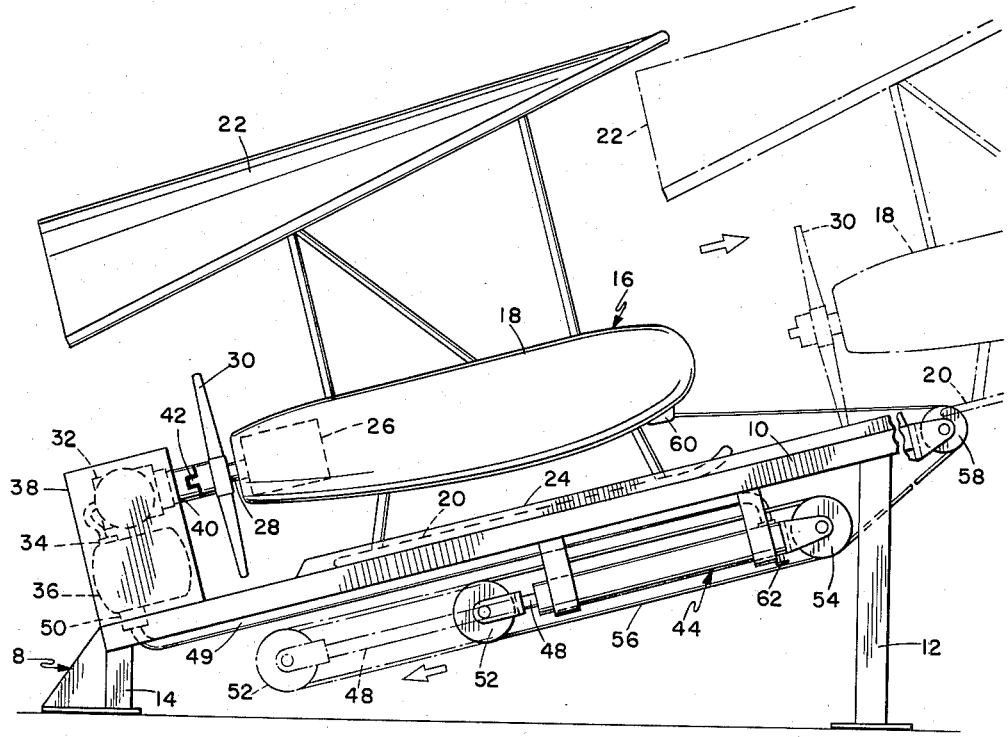

June 23, 1964

O. J. SAHOLT 3,138,352

LAUNCHING SYSTEM FOR PUSHER TYPE PROPELLER DRIVEN DRONES

Filed Aug. 16, 1962

INVENTOR.
ORVILLE J. SAHOLT
BY
*Knox & Knox*

United States Patent Office

3,138,352
Patented June 23, 1964

3,138,352
LAUNCHING SYSTEM FOR PUSHER TYPE PROPELLER DRIVEN DRONES
Orville J. Saholt, San Diego, Calif., assignor to The Ryan Aeronautical Co., San Diego, Calif.
Filed Aug. 16, 1962, Ser. No. 217,362
6 Claims. (Cl. 244—63)

The present invention relates generally to aircraft and more particularly to a launching system for pusher type propeller driven drones.

The primary object of this invention is to provide a system for launching drone aircraft, specifically the type driven by a pusher propeller, wherein the drone engine is utilized, during its initial warm-up period, to energize the launching mechanism.

Another object of this invention is to provide a launching system in which the drone is catapulted to launching speed by a compressed air powered mechanism, the drone engine being directly engaged with a compressor to build up the necessary pressure.

Another object of this invention is to provide a launching system in which the drone engine to compressor connection is automatically disengaged as the drone is launched, without the need for special release mechanism.

A further object of this invention is to provide a launching system which is incorporated into an integral unit, easily portable and requiring no additional power sources or services.

Figure 2:
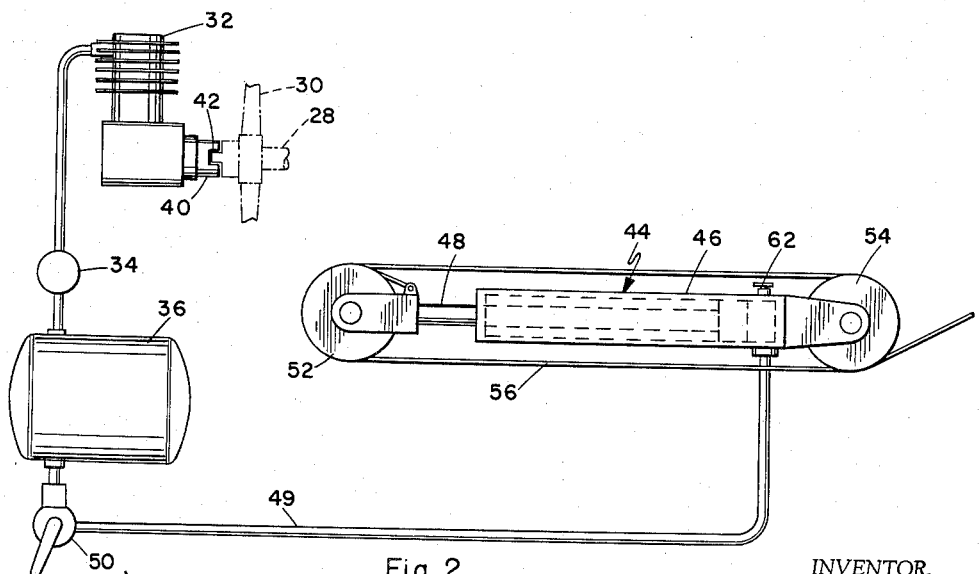

With these and other objects definitely in view, this invention consists in the novel construction, combination and arrangement of elements and portions, as will be hereinafter fully described in the specification, particularly pointed out in the claims, and illustrated in the drawing which forms a material part of this disclosure, and in which:

FIGURE 1 is a side elevation view of the complete launching system with a drone aircraft in place; and
FIGURE 2 is a diagram of the compressed air system.

Similar characters of reference indicate similar or identical elements and portions throughout the specification and throughout the views of the drawing.

Structure

The basic frame 8 of the structure comprises an elongated launching track 10 mounted on supports 12 and 14 at a suitable inclination to launch the drone aircraft 16 at the required angle, which will be dependent on the particular aircraft and its flying characteristics. The frame 8 can be fixed to the ground, be portable, or even be mounted on a truck or other vehicle, depending on the size of the structure. As illustrated, the drone 16 has a fuselage 18 supported on skids 20 and having a flexible lifting wing 22. This is merely an example of a drone type aircraft and other types are readily adaptable. The launching track 10 has guide rails 24 to guide skids 20, but the structure may vary considerably for wheels or other landing gear configurations. At the rear end of fuselage 18 is an engine 26 of suitable type, having a propeller shaft 28 on which is mounted a pusher propeller 30.

At the rear end of track 10 is an air compressor 32 coupled through a non-return valve 34 to a pressure storage tank or reservoir 36. The compressor 32 and reservoir 36 are mounted in a suitable support frame 38, said compressor having a drive shaft 40 which is positioned so as to be substantially in axial alignment with propeller shaft 28 when the drone 16 is in launch position. Drive shaft 40 and propeller shaft 28 are interconnected by a clutch 42, illustrated as a simple key and slot connection similar to an Oldham coupling, which will accommodate slight shaft misalignment if necessary. Other types of positive engagement, easily releasable clutches may be equally suitable.

Fixed beneath the track 10 is a catapult unit 44 comprising a cylinder 46 with an extensible piston 48, said cylinder being connected through a supply pipe 49 and release valve 50 to reservoir 36. Mounted on the extended end of piston 48 is a pulley block 52 and on the remote end of cylinder 46 is a similar pulley block 54. A cable 56 is wound around the pulley blocks 52 and 54, and is continued around a guide pulley 58 at the forward end of track 10 to a tow hook 60 on drone 16. Various types of quick release tow hooks have been developed for use on catapulted or towed aircraft, the specific type not being critical. The number of pulleys, extent of cable 56 and the length of track 10 will depend on the launching speed and guidance required by the particular drone, the multiple pulley arrangement providing a considerable extent of towing action for a relatively short piston stroke. Cylinder 46 is provided with a bleed 62 to release pressure after launch.

Operation

In the pre-launch position the drone 16 is at the rear end of track 10 with the clutch 42 engaged and cable 56 attached to tow hook 60, as indicated in full line in FIGURE 1, the piston 48 being retracted. The drone engine 26 is started in the normal manner and allowed to run for a short period to warm up. During this warm-up the compressor 32 is being driven by engine 26 and is charging reservoir 36 with compressed air. When sufficient pressure is reached the release valve 50 is actuated to release the stored energy of the compressed air. The release valve may be of the type which automatically opens at a predetermined peak pressure, or can be manually operated for accurate timing of the launch.

When the compressed air enters cylinder 46, the piston 48 is extended and the pulley blocks 52 and 54 are pulled apart, so reeling in cable 56. The drone 16 is consequently pulled along the track 10, as indicated in broken line in FIGURE 1, automatically disengaging clutch 42, so that the compressor 32 stops. The air pressure and the extension rate of piston 48 are predetermined to accelerate the drone 16 to the required flying speed by the time the end of track 10 is reached, after which the tow hook 60 releases cable 56 and the drone is in free flight. Bleed 62 is then opened to release pressure from cylinder 46, allowing piston 48 to retract and cable 56 to be extended for a subsequent launch.

The system facilitates the launching of drone aircraft of various sizes from virtually any location, without requiring tanks of compressed air, pumps, or auxiliary power sources, the drone engine itself providing all the power necessary during the initial part of its normal operation. This is of particular importance in military operations where transportation may be limited in some areas. Also, the system is relatively quiet and safe in operation in close proximity to personnel, as opposed to rocket boosted launching means which must be operated remotely. The system is completely self-contained in a single unit and the only preparation necessary for a launch is the placement of the drone on the launching track with the compressor driving clutch engaged.

It is understood that minor variation from the form of the invention disclosed herein may be made without departure from the spirit and scope of the invention, and that the specification and drawing are to be considered as merely illustrative rather than limiting.

I claim:

1. A launching system for a drone aircraft having a propulsion engine, the system comprising:
    an elongated launching track on which the drone aircraft rides;

a launching catapult on said track and having means for attachment to the aircraft;

a source of stored energy operatively connected to said catapult;

charging means coupled to said source to build up stored energy therein;

quickly releasable clutch means coupled between said charging means and the engine of said drone aircraft, whereby the said engine provides the sole driving power for said charging means;

and means to release the stored energy to said catapult.

2. A launching system for a drone aircraft having a propusion engine, the system comprising:

an elongated launching track on which the drone aircraft rides;

a fluid actuated catapult mounted on said track and having means for attachment to the aircraft;

a fluid pressure reservoir connected to said catapult;

release means between said reservoir and said catapult to release the fluid pressure into the catapult;

a compressor communicating with said reservoir;

and quickly releasable clutch means interconnecting said compressor with the engine of the drone aircraft, whereby the said engine is the sole source of power for operating said catapult.

3. The combination of a drone aircraft having a propulsion engine, and a launching system, comprising:

an elongated launching track on which said drone aircraft rides;

a fluid actuated catapult mounted on said track and having means for attachment to the aircraft;

a fluid pressure reservoir connected to said catapult;

release means between said reservoir and said catapult to release the fluid pressure to the catapult;

a compressor communicating with said reservoir;

and quickly releasable clutch means interconnecting said compressor with said engine, whereby the engine is the sole source of power for operating said catapult.

4. The combination of a drone aircraft having a rear mounted propulsion engine, and a launching system, comprising:

an elongated launching track on which said drone aircraft rides;

a fluid actuated catapult mounted on said track and having means for attachment to the aircraft;

a fluid pressure reservoir connected to said catapult;

release means between said reservoir and said catapult to release fluid pressure to the catapult;

a compressor mounted at the rear end of said track and communicating with said reservoir;

said compressor and said engine having clutch means inter-engageable when the aircraft is in an initial launch position at the rear end of said track, and said engine providing the sole source of power for operating said catapult.

5. The combination of claim 4 and wherein said engine has an extended shaft;

said compressor being mounted above said track and having a drive shaft axially aligned with said engine shaft when said aircraft is in the initial launch position;

said clutch means being directly coupled between the ends of said engine shaft and said drive shaft.

6. The combination of a drone aircraft having a rear mounted propulsion engine, and a launching system, comprising:

an elongated launching track on which said drone aircraft rides;

a fluid actuated catapult mounted on said track and having an extensible member;

a guide pulley rotatably mounted on the forward end of said track;

a cable coupled to said extensible member and passing around said guide pulley to said aircraft;

means releasably securing said cable to said aircraft;

a fluid pressure reservoir connected to said catapult;

release means between said reservoir and said catapult to release fluid pressure to the catapult;

a compressor mounted at the rear end of said track and communicating with said reservoir;

said compressor and said engine having clutch means inter-engageable when the aircraft is in an initial launch position at the rear end of said track, and said engine providing the sole source of power for operating said catapult.

References Cited in the file of this patent

UNITED STATES PATENTS

| | | |
|---|---|---|
| 1,708,249 | Abel | Apr. 9, 1929 |
| 1,960,264 | Heinkel | May 29, 1934 |